UNITED STATES PATENT OFFICE.

REINHOLD WALLBAUM, OF SÜDENDE, NEAR BERLIN, GERMANY.

PROCESS OF MANUFACTURING ASPHALT.

1,176,006.  Specification of Letters Patent.  Patented Mar. 21, 1916.

No Drawing.  Application filed November 12, 1913.  Serial No. 800,675.

*To all whom it may concern:*

Be it known that I, Dr. REINHOLD WALLBAUM, a German subject, residing at 13 Mittelstrasse, Südende, near Berlin, Germany, have invented a new and useful Improved Process of Manufacturing Asphalt, of which the following is a specification.

Asphalt powder for producing compressed asphalt has hitherto been made from the bituminous lime-stone present in nature, such lime-stone getting pulverized and then dried. The freight which is to be paid also for the filling material highly raises the price of such asphalt. It has therefore been attempted to manufacture artificial asphalt of this kind by impregnating dust-like filling-materials, such, for instance, as ground lime-stone, with asphalt-bitumen. By this means, however, a satisfactory result is not obtained, because it is impossible to cause the asphalt to be distributed in the filling-material equally.

According to my invention the dust-like filling material is mixed with an aqueous emulsion of asphalt, of the kind set forth in my British Patents No. 28,178 of 1910 and No. 23,468 of 1911. This permits of a simple, safe working. The filling material is preferably moistened to some extent and then kneaded after the emulsion of asphalt has been added. The filling-materials employed may consist of dust-like products somewhat capable of absorbing liquid, such, for example, as lime-stone, whiting or Spanish white, silicious lime-stone, trass, and dust-like chippings of stone-pits. Also natural asphalt-powder for producing compressed asphalt may be mixed with such emulsion and thus easily be made to contain a certain amount of asphalt. One can also proceed in such a way that the emulsion of asphalt, sufficiently diluted, is poured on the dry filling-material. The kneaded, thoroughly-mixed mass thus produced is then completely dried; small lumps which may be formed by the drying can be easily crushed and will fall to pieces on temperature rising. In this way a dark-brown powder is obtained in which the asphalt is contained in a finest equal distribution and which does not differ from the natural asphalt, designated to be compressed, as to appearance and properties.

The product is employed in the same manner as natural asphalt-powder; after having been heated it can be compressed by ramming or rolling to form a perfect, homogeneous road-covering.

Example: About 900 kilograms finely ground lime-stone are equally moistened and 200 kilograms emulsion of asphalt added. This mass is well agitated in a mixing and kneading machine and then brought in drying pans where it is perfectly dried at 80° C. while being constantly stirred.

What I claim is:

The herein described process consisting in moistening a dust-like filling-material, in adding an aqueous emulsion of asphalt in agitating the mass, and finally in drying the same while being constantly stirred.

In testimony thereof, I affix my signature in the presence of two subscribing witnesses.

Dr. REINHOLD WALLBAUM.

Witnesses:
 WOLDEMAR HAUPT,
 HARRY L. WILSON.